No. 711,769. Patented Oct. 21, 1902.
B. K. HUSSEY.
STEAM HEATER.
(Application filed Mar. 16, 1901.)
(No Model.) 3 Sheets—Sheet 2.
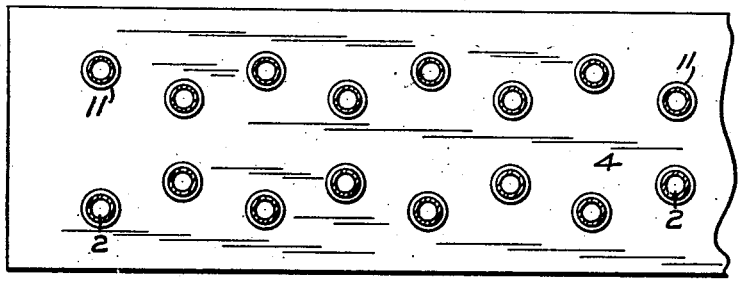
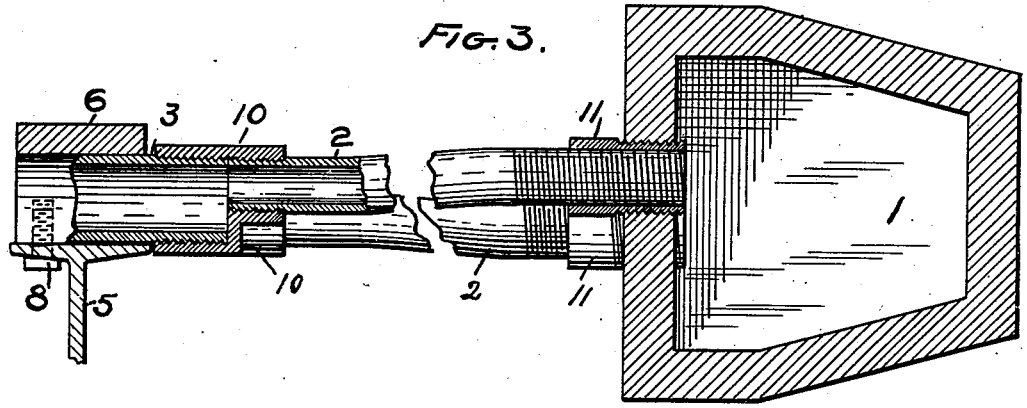
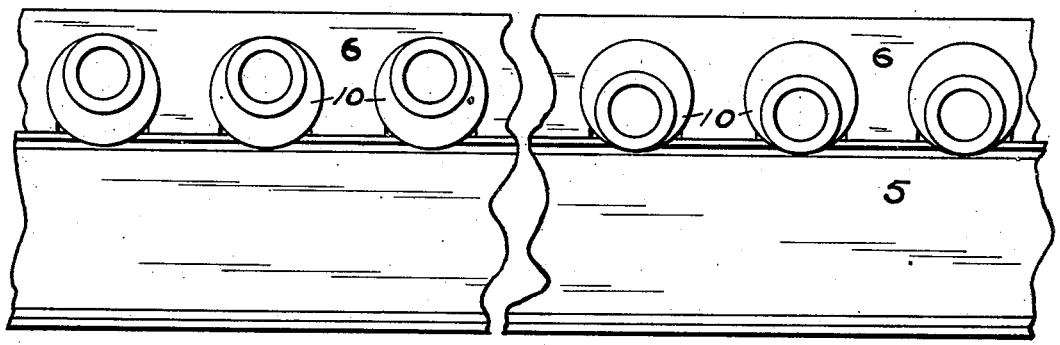
WITNESSES:
Florence E. Bryant,
H.C. Harding
INVENTOR.
Bryant K. Hussey.
BY V.H. Lockwood.
His ATTORNEY.

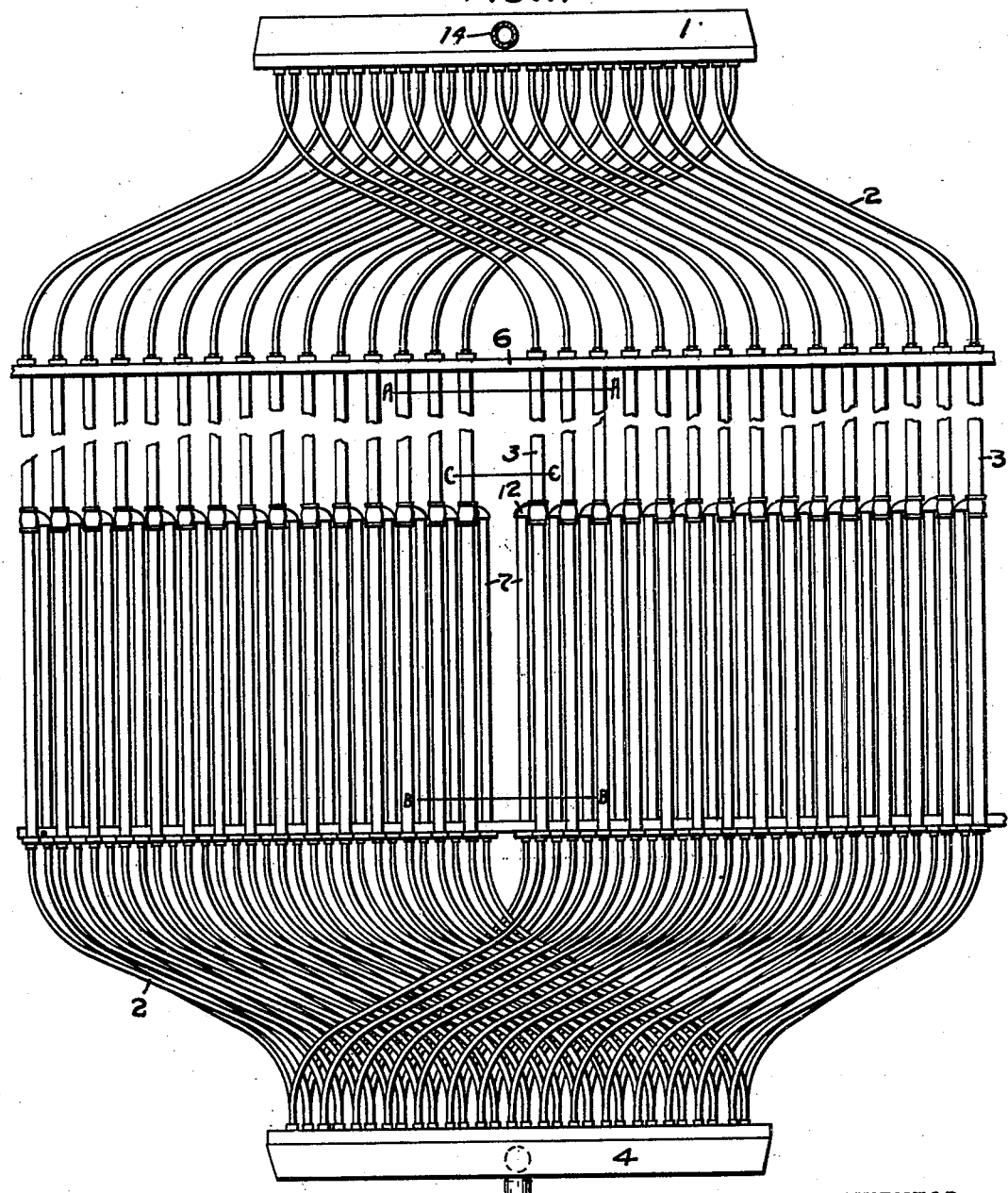

No. 711,769. Patented Oct. 21, 1902.
B. K. HUSSEY.
STEAM HEATER.
(Application filed Mar. 16, 1901.)
(No Model.) 3 Sheets—Sheet 3.
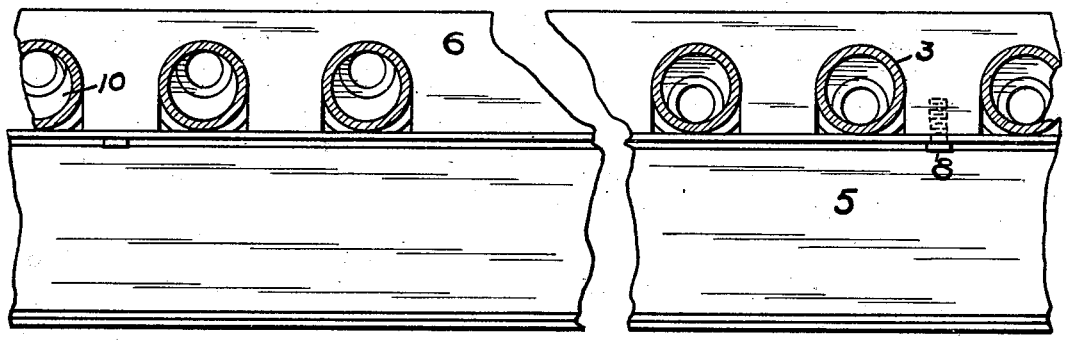
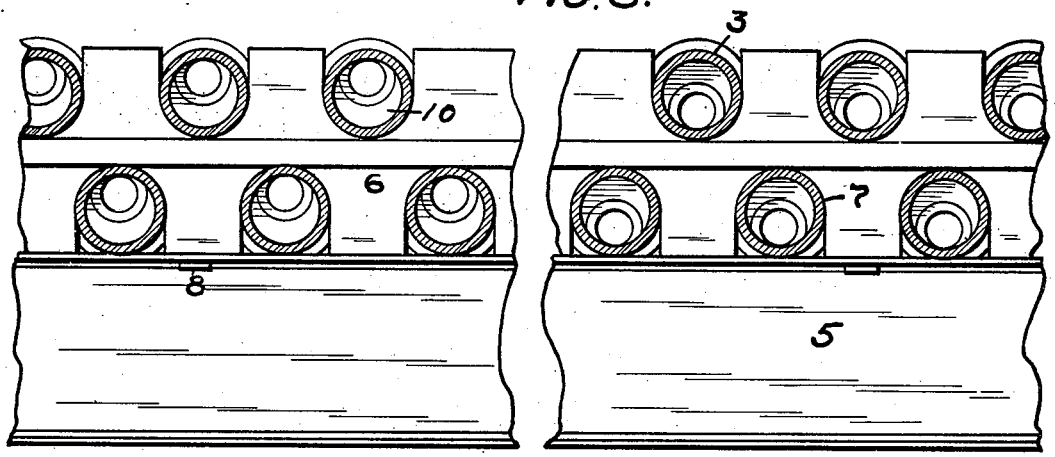
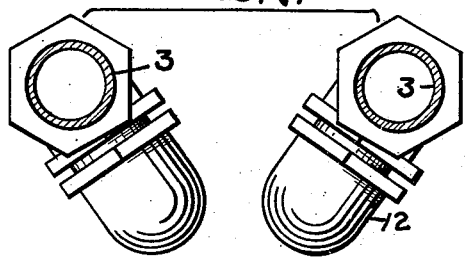
WITNESSES: Florence E. Bryant. H. C. Harding.
INVENTOR. Bryant K. Hussey. BY V. H. Lockwood. His ATTORNEY.

UNITED STATES PATENT OFFICE.

BRYANT K. HUSSEY, OF INDIANAPOLIS, INDIANA.

STEAM-HEATER.

SPECIFICATION forming part of Letters Patent No. 711,769, dated October 21, 1902.

Application filed March 16, 1901. Serial No. 51,473. (No model.)

*To all whom it may concern:*

Be it known that I, BRYANT K. HUSSEY, of Indianapolis, county of Marion, and State of Indiana, have invented a certain new and useful Steam-Heater; and I do hereby declare that the following is a full, clear, and exact description thereof, reference being had to the accompanying drawings, in which like numerals refer to like parts.

The object of this invention is to provide a new arrangement of heating pipes or apparatus in and for a dry-kiln, and especially adapted for use in a lumber-drier.

One feature of the invention consists in providing doubly-curved pipes for connecting the header with the main steam-pipes in the apparatus, whereby the joints will not be affected by the great expansion and contraction of the pipes which occur in large lumber-driers. The joints are not affected by any expansion or contraction of the pipes, because all the creeping is taken up by the curved pipes at the end. These curved pipes are formed in a double curve, (S-shaped,) making a straight connection at one end with the main pipe and a straight connection at the other end with the header, but with a reverse curve between the ends, which will take up any longitudinal creeping of the main pipes. To this end the header is stationary and also the main pipes are held immovable laterally, so that the only modification which can result from the creeping of the pipes is the increase or decrease in the curvature or bends of the end pipes, and this modification takes place some distance from the joints, and therefore does not affect the joints.

An advantage and effect of the above arrangement is that it enables me to place supplementary short pipes in connection with the main pipes at the end of the lumber-drier where increased heat is desired. To do this, a supplementary pipe may lead from a main pipe at some point between its ends to the curved pipe connecting it with the outlet-header. This supplementary pipe is shorter than the main pipe, so that the expansion and contraction of it and the main pipe would vary. Hence this arrangement is possible only in this system, because of the doubly-curved pipes at the end, which can without harm take up the difference in the expansion and contraction of the pair of pipes.

A feature of the invention kindred to the foregoing is the use, with main steam-pipes, of other pipes secured therewith, but being practically a continuation thereof, whereby any main steam-pipe that may be cracked or be injured can be removed without affecting the rest of the system by merely detaching it from the parts with which it is connected. This also enables all of the main steam-pipes to be of the same length. Another result is that it enables the header and connecting end pipes, whether curved or not, to be furnished at the factory separate from the main heating-pipes and there be connected with the set of main pipes, such as may be on hand at the factory or as may be desired in different parts of the factory. In other words, special lengths of main pipes will not be required with this system.

Another feature of the invention consists in crossing the pipes at the end before entering the header, whereby a single header at each end will suffice for a large number of pipes. The advantage resulting from this arrangement arises not only from the decreased cost in construction, but also from the fact that since all the steam for the whole series of pipes comes from a single header or source instead of a plurality, as has been the general custom, the same amount of heat will be conveyed to the various pipes in the series.

Another feature of the invention consists in connecting the steam-inlet header with the main pipes by smaller pipes, whereby they will bend readily from expansion and contraction and the steam will be equably distributed to the larger pipes. When only large pipes are used, there is often trouble in the steam from the header going wholly into only a portion of the pipes to the neglect of some of the other pipes. With this improvement, however, the pipes leading out of the header being initially small, the steam in its effort to get through them will crowd quickly into all of them. I provide both ends of the heating apparatus with these reduced connecting-pipes, the arrangement made at the steam-outlet end being not only that they may readily bend to relieve the main pipes, but also to baffle the steam that may be in a single main pipe and prevent its rapid passage therefrom. This does not affect the movement of the steam from any of the other pipes, its action in each pipe being independent. One effect of the use of the smaller end pipes is that the pipes may be in the same plane, the small pipes leading from the upper part of the main pipes on one side of the lumber-drier crossing over and resting upon the small pipes that lead from the lower side of the main pipes on the other side of the lumber-drier. These small pipes thus can be crossed and maintained substantially in the same plane without any dropping, as is so common. The whole set of heating-pipes may thus be provided for a large lumber-drier and keep within a two-inch plane from end to end.

These and the other features of my invention will more fully appear from the accompanying drawings and the following description and claims.

In the drawings, Figure 1 is a plan of the system of heating-pipes centrally broken away. Fig. 2 is an elevation of the inner face of the outlet-header, one end being broken away and showing the pipes connected therewith in cross-section. Fig. 3 is a central longitudinal section of the inlet end, including the inlet-header, small inlet-pipes, and main pipes, parts being broken away. Fig. 4 is an end elevation of the connecting-sleeves on the inlet ends of a number of main pipes and the means for supporting the main pipes, parts being broken away. Fig. 5 is a section on the line A A of Fig. 1 on the inside of the supports for said pipes at their inlet end looking toward the inlet-header. Fig. 6 is the same as Fig. 5 for the outlet end of the heating apparatus, being on the line B B of Fig. 1 looking toward the outlet-header. Fig. 7 is a section of two main pipes on the line C C in Fig. 1, showing the end elevation of two supplementary pipes.

The heating apparatus shown in the drawings consists of an inlet-header 1, a number of small doubly-curved connecting-pipes 2, a number of main heating-pipes 3, and an outlet-header 4, with the attendant parts necessary to hold them in place. The main pipes 3 rest upon suitable cross-beams 5, as appears in Figs. 5 and 6, and are held from lateral movement by spreaders 6. At the inlet end there is only one row or series of pipes 3, as shown in Fig. 5. At the outlet end there are two series of pipes, as appears in Fig. 6, the top series being the main heating-pipes 3, (shown in Fig. 5,) and the lower series being branch or supplementary short heating-pipes 7. The spreader consists of a metal plate with a series of notches on the bottom edge, leaving extensions between them that when in place extend between the pipes and rest upon the beam 5. The spreader is secured to the beam 5 by a screw-bolt 8, which appears in Figs. 3 and 5, or may be held in place by any other means, so as to hold the pipes from lateral movement. Where a double row of pipes is to be held in place, the spreader is notched on both the upper and lower edges, as appears in Fig. 6. The spreader permits the pipes to have only longitudinal movement. The curved pipes 2 are straight at each end for a short distance and then bent in the form of a reverse curve, so the curvature is removed some distance from the ends. The curved pipes here shown are smaller than the main pipes, the main pipes being preferably one-inch pipes and the curved pipes half-inch pipes.

The union between the curved pipes and the straight main pipes is illustrated in Figs. 3 and 4. It consists of the sleeve 10, with a large end, which screws upon a large pipe, and a small end, which is not concentric with the sleeve, but is set to one side of the center, and into this the small pipe is screwed. On the main pipes in the right half of the series shown in Fig. 1 the sleeve 10 is turned into the position shown in section in Fig. 3 and an end elevation in the left half of Fig. 4 with the small end of the sleeve uppermost. The sleeve is reversed on the left half of the pipes shown in Fig. 1, so that the small end of the sleeve 10 is in its lowest position, as appears in the right half of Fig. 4, and in the sleeve shown in Fig. 3 behind the sectioned sleeve. The small pipes 2, extending from the right half of the series of main pipes in Fig. 1 and from the sleeve 10, whose small end is uppermost, cross and rest upon the other half of the small pipes, as is clear in Fig. 1, so that the two layers of pipes will not occupy appreciably more space vertically than the one layer of large pipes, whereby the large and small pipes will be substantially in the same plane, as appears in Fig. 3. Therefore the whole set of pipes when the branch heating-pipes 7 are not used can be set in a vertical space of less than two inches. There is a great saving in space, and a drop in the pipes is not required with the construction herein shown. Also the large pipes may be singly unscrewed and removed and replaced without disturbing other pipes.

The connection between the small pipes and the header is shown in Fig. 3. A sleeve 11 screws into the header to a limit, and the end of the small pipe screws into said sleeve any distance that may be necessary to put it in exactly the right position. I preferably stagger the positions of the connections of the pipes with the headers, as appears in the upper and lower half of Fig. 2. At the outlet end the same construction is made, as above explained, excepting that a double header is required to accommodate the connecting-pipes 2 from the two sets of pipes 3 and 7, (shown in Fig. 6,) and that makes four sets of small pipes, as appears in Fig. 2.

From the foregoing description it is seen that the ends of the small pipes connected with the header are immovable while in use and that the ends of the small pipes connected with the main pipes 3 are likewise immovable in any direction excepting what is due to the longitudinal creeping of the large pipes. The two ends, therefore, of the curved pipes being immovable excepting from the creeping of the main pipes, it is clear that such longitudinal movement of the main pipes will be taken up by the two curves in the small curved pipes. A lengthening of the main pipe will increase the curvature at the two curves in the small pipe, and the contraction of the main pipe will decrease the curvature of the small pipe. The only change that will occur is in the degree of curvature of the small pipes, and the pipes at the union between the large and small pipes will only move longitudinally, and thus not affect the joints, and there can be no appreciable movement of the end of the small pipe at its connection with the header, so that the joints there cannot be affected.

The branch pipes 7 are much shorter than the main pipes 3, and therefore there may be difference of contraction and expansion between these two series of pipes; yet, since they are connected with the outlet-header by small curved pipes, all longitudinal movement of them, however varying, will be taken up by the curved pipes.

The union between the short pipe 7 and the main pipe 3 is illustrated in Fig. 7. It is an elbow 12, extending from a T in the main pipe, and the branch pipe screws into said elbow. The elbow 12 extends from the main pipe in a laterally-inclined direction, so that the short pipe 7 will not be under the main pipe, but its position will be staggered with reference to the position of the main pipes, as appears in Figs. 1 and 6.

13 is a drain-pipe leading from the outlet-header.

14 is the steam-inlet pipe.

What I claim as my invention, and desire to secure by Letters Patent, is—

1. In a steam-heater, the combination of a pair of oppositely-placed steam-headers, a series of straight main heating-pipes located between said headers and extending toward them, and connecting-pipes extending obliquely from the ends of the main pipes to the headers and arranged in a laterally-extending row with the connecting-pipes on one side crossing under those on the other side.

2. In a steam-heater, the combination of a number of main pipes, a number of smaller pipes, and sleeves connecting the small pipes with the large ones having an eccentric small end for holding the small pipes, a portion of said connecting-sleeves being secured on the large pipes with their small ends uppermost and the remainder with their small ends in their lowest position, substantially as set forth.

In witness whereof I have hereunto affixed my signature in the presence of the witnesses herein named.

BRYANT K. HUSSEY.

Witnesses:
V. H. LOCKWOOD,
FLORENCE E. BRYANT.